(12) United States Patent
Nakazeki et al.

(10) Patent No.: US 8,336,328 B2
(45) Date of Patent: Dec. 25, 2012

(54) AIR CYCLE REFRIGERATING/COOLING SYSTEM AND TURBINE UNIT USED THEREFOR

(75) Inventors: Tsugito Nakazeki, Iwata (JP); Takayoshi Ozaki, Iwata (JP); Hiroyuki Yamada, Iwata (JP); Yoshihide Umetsu, Yokohama (JP)

(73) Assignee: NTN Corporation, Osaka (JP)

( * ) Notice: Subject to any disclaimer, the term of this patent is extended or adjusted under 35 U.S.C. 154(b) by 1168 days.

(21) Appl. No.: 12/064,614

(22) PCT Filed: Aug. 10, 2006

(86) PCT No.: PCT/JP2006/315821
§ 371 (c)(1),
(2), (4) Date: Feb. 22, 2008

(87) PCT Pub. No.: WO2007/023684
PCT Pub. Date: Mar. 1, 2007

(65) Prior Publication Data
US 2009/0260388 A1    Oct. 22, 2009

(30) Foreign Application Priority Data

Aug. 22, 2005 (JP) ................................. 2005-239464
Aug. 23, 2005 (JP) ................................. 2005-240560

(51) Int. Cl.
*F25D 9/00* (2006.01)
(52) U.S. Cl. .......................................... 62/402; 62/401
(58) Field of Classification Search .................. 62/402, 62/401; 415/229, 108; 417/407; 384/317, 384/321, 476, 91, 103, 106
See application file for complete search history.

(56) References Cited

U.S. PATENT DOCUMENTS

| 2,973,136 | A | * | 2/1961 | Greenwald | .................... | 417/407 |
| 3,728,857 | A | * | 4/1973 | Nichols | ............................ | 62/469 |
| 4,735,559 | A | | 4/1988 | Morishita et al. | | |
| 5,310,311 | A | * | 5/1994 | Andres et al. | ................. | 415/229 |
| 5,605,045 | A | | 2/1997 | Halimi et al. | | |
| 5,709,103 | A | * | 1/1998 | Williams | ......................... | 62/402 |
| 5,836,739 | A | * | 11/1998 | Haramura et al. | ............. | 415/104 |
| 6,032,466 | A | * | 3/2000 | Woollenweber et al. | ........ | 60/607 |

(Continued)

FOREIGN PATENT DOCUMENTS

CN 1410732 4/2003

(Continued)

OTHER PUBLICATIONS

International Search Report (Japanese and English) for PCT/JP2006/315821 mailed Sep. 19, 2006 (4 pages).

(Continued)

*Primary Examiner* — Kenneth Rinehart
*Assistant Examiner* — Timothy K Trieu
(74) *Attorney, Agent, or Firm* — Osha Liang LLP

(57) ABSTRACT

The air cycle refrigerating/cooling system compresses air that has flown in with a compressor (6) in a turbine unit (5) and adiabatically expands the air with an expansion turbine (7) in a turbine unit (5). In the turbine unit (5), a compressor rotor (6a) of the compressor (6) and a turbine rotor (7a) of the expansion turbine (7) are attached to the same main shaft (13), the main shaft (13) is supported by bearings (15) and (16) so as to be freely rotatable, and part or the entirety of the thrust force applied to this main shaft (13) is supported by an electromagnet (17).

5 Claims, 12 Drawing Sheets

U.S. PATENT DOCUMENTS

| | | | |
|---|---|---|---|
| 6,050,103 A * | 4/2000 | Ko | 62/401 |
| 6,255,752 B1 * | 7/2001 | Werner | 310/90.5 |
| 6,558,139 B2 * | 5/2003 | Nguyen et al. | 417/420 |
| 6,662,575 B2 * | 12/2003 | Clarke | 62/87 |
| 6,926,490 B2 * | 8/2005 | McAuliffe et al. | 415/1 |
| 2004/0252924 A1 | 12/2004 | Kiuchi et al. | |
| 2005/0126171 A1 | 6/2005 | Lasker | |
| 2006/0177333 A1 | 8/2006 | Sakuda et al. | |

FOREIGN PATENT DOCUMENTS

| | | |
|---|---|---|
| GB | 2 298 901 | 9/1996 |
| JP | 04-327021 A | 11/1992 |
| JP | 7-91760 | 4/1995 |
| JP | 7-259855 | 10/1995 |
| JP | 8-261237 | 10/1996 |
| JP | 2623202 | 4/1997 |
| JP | 09-291832 A | 11/1997 |
| JP | 2000-97507 | 4/2000 |
| JP | 2000-121184 | 4/2000 |
| JP | 2003-222141 A | 8/2003 |
| JP | 2003-232366 A | 8/2003 |
| JP | 2004-183614 A | 7/2004 |
| WO | 2004/111458 A1 | 12/2004 |

OTHER PUBLICATIONS

Patent Abstracts of Japan 2000-121184 dated Apr. 28, 2000 (1 page).
Patent Abstracts of Japan 08-261237 dated Oct. 8, 1996 (1 page).
Patent Abstracts of Japan 2000-097507 dated Apr. 4, 2000 (1 page).
Patent Abstracts of Japan 07-259855 dated Oct. 9, 1995 (1 page).
Patent Abstracts of Japan 06-207755 dated Jul. 26, 1994 (1 page).
Patent Abstracts of Japan 07-091760 dated Apr. 4, 1995 (1 page).
Nikkei Mechanical Magazine, "Cooling Air with Air," issued on Nov. 13, 1995 No. 467; pp. 46 to 52.
Office Action received in corresponding U.S. Appl. No. 12/064,621, dated Nov. 9, 2011 (19 pages).
Office Action in Japanese Application No. 2005-239464, Dated Jan. 18, 2011 (6 Pages With English Translation).
Patent Abstracts of Japan 09-291832, Dated Nov. 11, 1997 (1 Page).
Patent Abstracts of Japan 2003-232366, Dated Aug. 22, 2003 (1 Page).
Patent Abstracts of Japan 2003-222141, Dated Aug. 8, 2003 (1 Page).
Patent Abstracts of Japan 2004-183614, Dated Jul. 2, 2004 (1 Page).
English translation of the International Preliminary Report on Patentability and of the Written Opinion of the International Searching Authority, for PCT/JP2006/315821, mailed Mar. 6, 2008, 5 pages.
Office Action in U.S. Appl. No. 12/064,621, Dated Mar. 22, 2011(22 Pages).
Chinese Office Action for Application No. 2006800304142, Mailing Date: Oct. 31, 2008, and English translation thereof, 17 pages.
Office Action in Japanese Application No. 2005-239464, Issued Oct. 4, 2011 (6 Pages with English Translation).
English Patent Abstract of JP 04-327021, Published Nov. 16, 1992 (1 Page).
Korean Office Action from Korean Application No. 10-2008-7004895 issued Oct. 5, 2012. (6 pages).

* cited by examiner

AIR CYCLE REFRIGERATING/COOLING SYSTEM AND TURBINE UNIT USED THEREFOR

BACKGROUND OF THE INVENTION

The present invention relates to an air cycle refrigerating/cooling system where air is used as a coolant and which is used in refrigerated warehouses, low temperature rooms at zero degrees or lower and for air conditioning, and to a turbine unit for air cycle refrigerating/cooling in such a system.

The use of air as a coolant is preferable from the point of view of environmental protection and safety, but does not provide sufficient properties in terms of energy efficiency in comparison with the case where chlorofluorocarbons, ammonium gas or the like is used. In the case where air is used as a coolant in a facility where it can be directly blown into, such as refrigerated warehouses, however, there is a possibility that the total cost can be lowered to that of the existing system by devising a means for omitting fans within a warehouse or defrosting systems. At present, the use of chlorofluorocarbons as a coolant has already been regulated from an environmental point of view, and it is also desired to avoid the use of other gases as a coolant as much as possible. Therefore, air cycle refrigerating/cooling systems in which air is used as a coolant in such applications as described above have been proposed (for example, Patent Document 1 and Non-Patent Document 1).

In addition, it has been stated that the theoretical efficiency of cooling with air becomes the same as or higher than that with chlorofluorocarbons or ammonium gas in a deeply cold range from −30° C. to −60° C. (Non-Patent Document 1). It has also been stated, however, that the above described theoretical efficiency of cooling with air can be attained only with peripheral apparatuses which are optimally designed. The peripheral apparatuses include a compressor, an expansion turbine and the like.

Turbine units where a compressor rotor and an expansion turbine rotor are attached to the same main shaft are used as the compressor and the expansion turbine (Patent Document 1, Non-Patent Document 1).

Here, magnetic bearing type turbine compressors where a turbine rotor is attached to one end of the main shaft, a compressor rotor is attached to the other end, and the above described main shaft is supported by a journal bearing and a thrust bearing, each bearing is controlled with a current through an electromagnet, have been proposed as a turbine compressor for processing a process gas (Patent Document 2).

In addition, a reduction in the thrust load which affects the rolling contact bearing through the use of a thrust magnetic bearing has been proposed for gas turbine engines in order to prevent the thrust load which affects the rolling contact bearing for supporting the main shaft from making the life of the bearing shorter (Patent Document 3).

Patent Document 1: Japanese Patent No. 2623202
Patent Document 2: Japanese Laid-open Patent Publication No. 7-91760
Patent Document 3: Japanese Laid-open Patent Publication No. 8-261237
Non-Patent Document 1: Nikkei Mechanical Magazine, "Cooling Air with Air," issued on Nov. 13, 1995, No. 467, pages 46 to 52

As described above, air cycle refrigerating/cooling systems require an optimally designed compressor and expansion turbine in order to attain the theoretical efficiency of air cooling, which becomes of a high efficiency in the deeply cold range.

As described above, turbine units where a compressor rotor and an expansion turbine rotor are attached to the same main shaft are used as the compressor and the expansion turbine. In these turbine units, the compressor rotor can be driven with the power generated by the expansion turbine, and thus, the efficiency of the air cycling refrigerator is increased.

In order to attain the efficiency for practical use, however, it is necessary to keep the gap between the rotors and the housing microscopic. Fluctuations of this gap prevent a stable high speed rotation, and thus, cause a reduction in the efficiency.

In addition, air which affects the compressor rotor and the turbine rotor makes the thrust force affect the main shaft, and thus, a thrust load is imposed on the bearing for supporting the main shaft. The rotational speed of the main shaft of the turbine unit in air cycle refrigerating/cooling systems is 80,000 to 100,000 rotations per minute, which is a very high speed in comparison with bearings for general applications. Therefore, thrust loads as described above cause the durability of the bearing for supporting the main shaft to decrease and the life to become shorter, and thus, decreases the reliability of the turbine unit for air cycle refrigerating/cooling. It is difficult to put a turbine unit for air cycle refrigerating/cooling into practice, and thus, put an air cycle refrigerating/cooling system into practice without solving the problem of the durability of the bearing as described above. The above described technologies disclosed in Patent Document 1 and Non-Patent Document 1, however, do not solve the problem where the durability of the bearing against the thrust load for such a high speed rotation decreases.

In such a magnetic bearing type turbine compressor as that of Patent Document 2 where the main shaft is supported by a journal bearing made up of a magnetic bearing and a thrust bearing made up of a magnetic bearing, the journal bearing does not have a function of restricting movement in the axial direction. Therefore, when there is an unstable factor in the control of the thrust bearing, it is difficult to provide a stable high speed rotation while keeping a microscopic gap between the above described rotors and housing. In the case of a magnetic bearing, there is also a problem of contact at the time of power failure.

SUMMARY OF THE INVENTION

An object of this invention is to provide an air cycle refrigerating/cooling system where a stable high speed rotation can be attained while keeping the gap between the rotors and the housing microscopic in the turbine unit so that a high efficiency in compression and expansion can be attained, and the durability and the life of the bearing for supporting the main shaft of the turbine unit can be increased so that an increase in the reliability of the system can be achieved, as well as a turbine unit for air cycle refrigerating/cooling for this system.

A first aspect of the present invention provides an air cycle refrigerating/cooling system composing a turbine unit which includes a compressor (centrifugal compressor) for compressing air and an expansion turbine (radial flow turbine) for adiabatically expanding the air, wherein a compressor rotor of said compressor and a turbine rotor of said expansion turbine are attached to the same main shaft in said turbine unit in such a manner that said main shaft is rotatably supported by a bearing, and part or the entirety of the thrust force applied to this main shaft is supported by an electromagnet.

In the air cycle refrigerating/cooling system according to the first aspect of the present invention, the above described thrust force is supported by an electromagnet, and therefore, the thrust force which affects the bearing for supporting the rotating main shaft can be reduced while preventing the torque from increasing without any contact so that the durability and the life of the bearing can be increased. Unlike a permanent magnet, the support by means of an electromagnet makes it possible to appropriately control the electromagnetic attraction force in accordance with the thrust force which affects the main shaft. As a whole, the reliability of the air cycle refrigerating/cooling system increases because of an increase in the durability of the main shaft bearing. In this manner, the durability and the reliability of the main shaft bearing in the turbine unit, which becomes an obstacle in the air cycle refrigerating/cooling system, increase, and therefore, it becomes possible to put the air cycle refrigerating/cooling system into practice.

The air cycle refrigerating/cooling system according to the first aspect of the present invention may be a system, further comprising a pre-compressing unit, a heat exchanger and another heat exchanger, wherein the air is compressed by said pre-compressing unit, cooled by said heat exchanger, compressed by the compressor in said turbine unit, cooled by said another heat exchanger and adiabatically expanded by the expansion turbine in said turbine unit in sequence, and said turbine unit drives said compressor rotor with the power generated by said turbine rotor. This is referred to as an air cycle refrigerating/cooling system according to a second aspect of the present invention.

In the air cycle refrigerating/cooling system according to the second aspect of the present invention, air from the inflow is compressed by a pre-compressing unit and cooled by a heat exchanger in such a state that the temperature is increased as a result of this compression. The cooled air is further compressed by the compressor in the turbine unit so that the temperature is increased, and then is again cooled by another heat exchanger. This cooled air is cooled by another heat exchanger and led to the expansion turbine in the turbine unit so as to be cooled through adiabatic expansion to the target temperature, that is, a very low temperature of, for example, approximately −30° C. to −60° C., and then discharged.

The turbine unit where a compressor rotor and a turbine rotor in the above described expansion turbine are attached to the same main shaft drives the compressor rotor with the power generated in the turbine rotor, and therefore, requires no power source, and thus, allows the compact configuration to efficiently cool. A thrust force is applied to the main shaft of this turbine unit due to the air pressure which affects the rotors. In addition, the turbine unit used in the air cycle refrigerating/cooling system provides a very high speed rotation of, for example, approximately 80,000 to 100,000 rotations per minute. Therefore, when the above described thrust force affects the bearing for supporting the rotating main shaft, the durability of the main shaft is reduced.

In this second aspect of the present invention as well, the above described thrust force is supported by an electromagnet, and therefore, the thrust force which affects the bearing for supporting the rotating main shaft can be reduced while preventing the torque from increasing without any contact so that the durability and the life of the bearing can be increased. Unlike a permanent magnet, the support by means of an electromagnet makes it possible to appropriately control the electromagnetic attraction force in accordance with the thrust force which affects the main shaft. The durability of the main shaft bearing increases, and therefore, as a whole, the reliability of the air cycle refrigerating/cooling system increases.

In this manner, the durability and the reliability of the main bearing in the turbine unit, which is an obstacle in the air cycle refrigerating/cooling system, increase, and therefore, it becomes possible to put the air cycle refrigerating/cooling system into practice.

In this aspect, a compressor rotor in the above described compressor, a turbine rotor in the above described expansion turbine and a motor rotor may be attached to the same main shaft so that the main shaft can be rotated by means of a magnetic force from the motor stator which faces the above described motor rotor, and thus, the above described compressor rotor may be driven in the above described turbine unit for air cycle refrigerating/cooling. This is referred to as an air cycle refrigerating/cooling system according to a third aspect of the present invention.

In the case where the main shaft is driven by a motor which is provided as that in the third aspect, it becomes unnecessary to provide a pre-compressing unit, such as a blower, in a stage before the compressor.

The turbine unit for air cycle refrigerating/cooling according to a fourth aspect of the present invention is a turbine unit for air cycle refrigerating/cooling which is used in the air cycle refrigerating/cooling system according to the above described second aspect, wherein the above described bearing is a rolling contact bearing for supporting the above described main shaft in the radial direction, and further comprising an air pressure measuring unit for measuring air pressure in at least one of the above described compressor and the above described expansion turbine. It is preferable for the above described rolling contact bearing to have a function of holding the inner and outer rings in the axial direction as a deep groove ball bearing. It may also be an angular ball bearing.

In the turbine unit for air cycle refrigerating/cooling according to this fourth aspect, air which becomes a coolant in the air cycle refrigerating/cooling system is cooled by a heat exchanger. The expansion turbine is used so as to cool the air that has been cooled by the above described heat exchanger to a target temperature, that is, a very low temperature of, for example, approximately −30° C. to −60° C. through adiabatic expansion and discharge the air.

This turbine unit where a compressor rotor and a turbine rotor of the above described expansion turbine are attached to the same main shaft so that the compressor rotor is driven by the force generated by the turbine rotor requires no power supply, and thus, can make the compact configuration to efficiently cool.

In order to secure the efficiency in the compression and expansion of this turbine unit, it is necessary to keep the gap between the rotors and the housing microscopic. It is important to secure this efficiency of the air cycle refrigerating/cooling system. In order to do so, the main shaft of the rotors is supported by a rolling contact bearing so that the position of the main shaft is restricted to a certain degree due to the function of restricting movement in the axial direction by the rolling contact bearing, and thus, the microscopic gap between the rotors and the housing can be kept constant.

However, a thrust force is applied to the main shaft of the turbine unit due to air pressure or the like which affects the rotors. In addition, the turbine unit used in the air cooling system provides a very high rotational speed of, for example, approximately 80,000 to 100,000 rotations per minute. Therefore, when the above described thrust force affects the rolling contact bearing for supporting the rotating main shaft, the durability of the bearing is reduced.

In this fourth aspect as well, the above described thrust force is supported by an electromagnet, and therefore, the thrust force which affects the rolling contact bearing for supporting the main shaft can be reduced while preventing the torque from increasing without any contact. In this case, an air pressure measuring unit for measuring the air pressure of at least one of the above described compressor and the above described expansion turbine is provided, and therefore, the thrust force which affects the above described main shaft can be detected by using the air within the compressor and the expansion turbine. As a result, the attraction force of the above described electromagnet can be controlled on the basis of the output of the air pressure measuring unit, and thus, the rolling contact bearing can be used in such a state as to be optimal for the thrust force in accordance with the specification of this bearing.

In particular, an air pressure measuring unit is used as a detection unit, and therefore, the configuration of the detection unit is simple and has high reliability.

Therefore, a stable high speed rotation of the main shaft can be attained with the rotors keeping appropriate gaps, and the durability and the life of the rolling contact bearing can be increased. The durability of the rolling contact bearing for supporting the main shaft increases, and therefore, as a whole, the reliability of the turbine unit for air cycle refrigerating/cooling increases, and thus, as a whole, the reliability of the air cycle refrigerating/cooling system increases. In this manner, the stable high speed rotation, durability and reliability of the main shaft bearing in the turbine unit, which is an obstacle of the air cycle refrigerating/cooling system, can be increased, and therefore, it becomes possible to put the air cycle refrigerating/cooling system into practice.

In addition, the operational state of the air cycle refrigerating/cooling system as a whole affects the air pressure within the above described compressor and expansion turbine, and the above described air pressure measuring unit is provided to measure the air pressure of at least one of the compressor and the above described expansion turbine, and therefore, can be used to monitor the operational state of the air cycle refrigerating/cooling system in addition to controlling the above described electromagnet.

In this aspect, the compressor rotor of the above described compressor, the turbine rotor of the above described expansion turbine and the motor rotor may be attached to the same main shaft so that the main shaft can be rotated by the magnetic force from the motor stator which faces the above described motor rotor, and thus, the above described compressor rotor can be driven. This is referred to as a turbine unit for air cycle refrigerating/cooling according to a fifth aspect of the present invention.

In the case where the main shaft is driven by providing a motor as in the fifth aspect, it becomes unnecessary to provide a pre-compressing unit, such as a blower, in a stage before the compressor.

BRIEF DESCRIPTION OF THE DRAWINGS

In any event, the present invention will become more clearly understood from the following descriptions of the preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
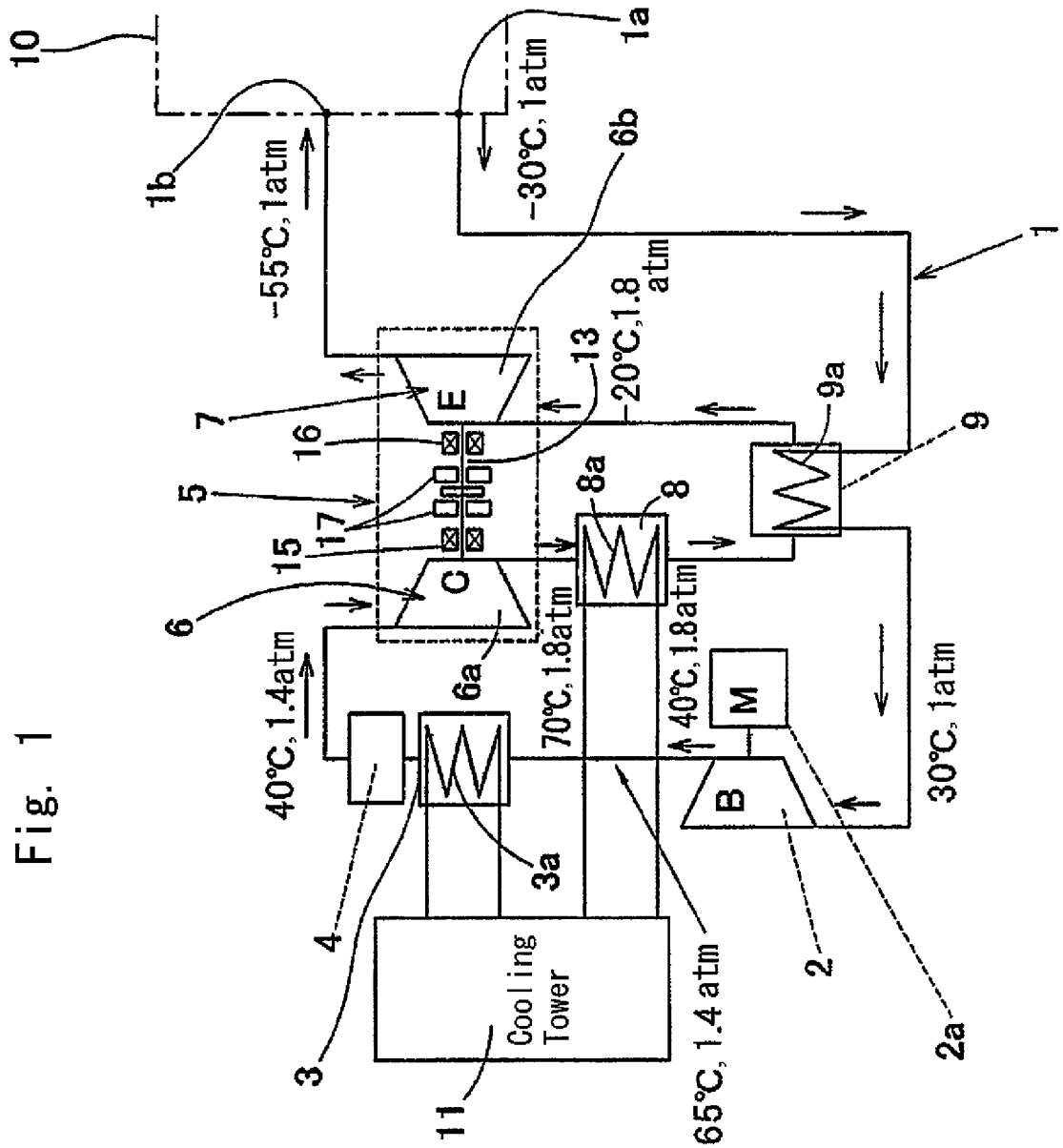
FIG. 1 is a system diagram showing an air cycle refrigerating/cooling system according to the first embodiment of this invention.
Figure 2:
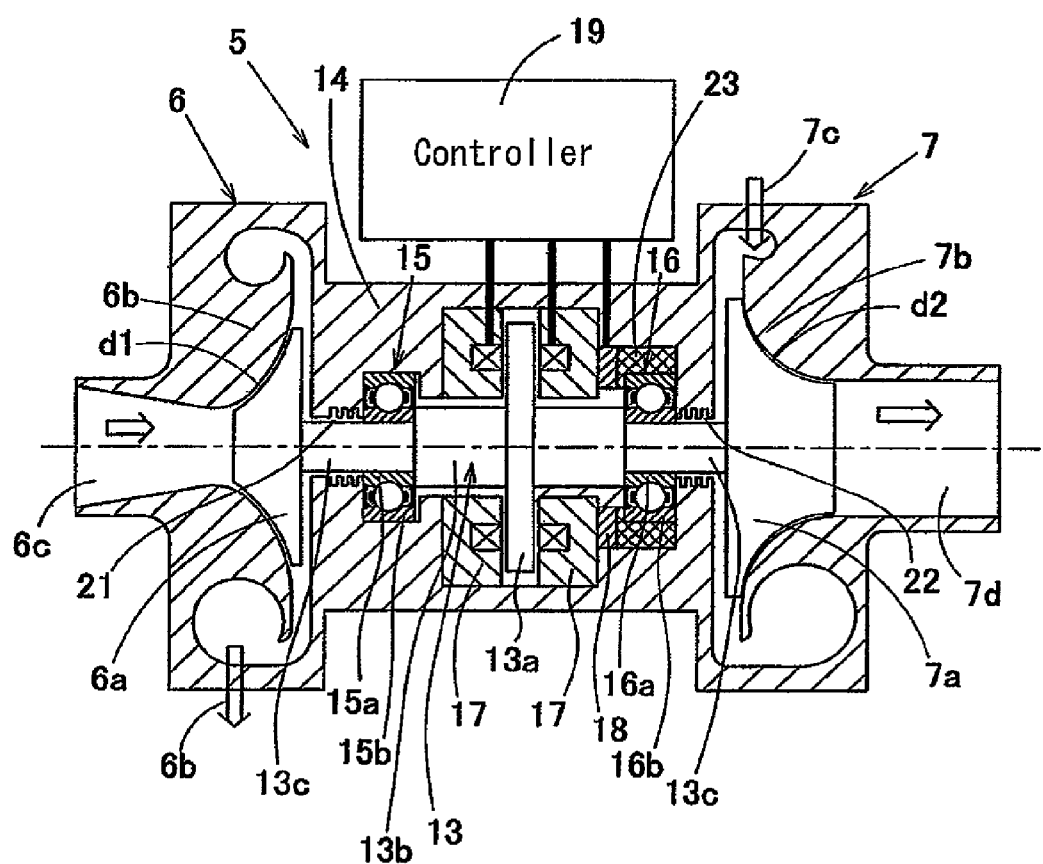
FIG. 2 is a cross sectional diagram showing a turbine unit for air cycle refrigerating/cooling used in the air cycle refrigerating/cooling system.

The first embodiment of this invention is described in reference to FIGS. 1 and 2. FIG. 1 shows the entire configuration of the air cycle refrigerating/cooling system. This air cycle refrigerating/cooling system is a system for cooling air in a space to be cooled 10, such as a refrigerator, directly as a coolant and has an air circulation path 1 that reaches from an air inlet 1a to an outlet 1b, which are respective openings in the space to be cooled 10. This air circulation path 1 is provided with a pre-compressing unit 2, a first heat exchanger 3, a dehumidifier 4, a compressor 6 in a turbine unit 5 for air cycle refrigerating/cooling, a second heat exchanger 8, an intermediate heat exchanger 9 and an expansion turbine 7 in the above described turbine unit 5 in this order. The intermediate heat exchanger 9 exchanges heat between the air in the vicinity of the inlet 1a that has flown into the air circulation path 1 and the air of which the temperature rises through the compression in the rear stage and which is then cooled, and thus, the air in the vicinity of the inlet 1a passes through a core 9a of the heat exchanger 9.

The pre-compressing unit 2 is made up of a blower or the like and driven by a motor 2a. The first heat exchanger 3 and the second heat exchanger 8, respectively, have heat exchangers 3a and 8a for circulating a coolant and exchange heat between the coolant, such as water, in the heat exchangers 3a and 8a and the air in the air circulation path 1. The heat exchangers 3a and 8a are respectively connected to a cooling tower 11 through pipes so that the coolant, of which the temperature has risen as a result of heat exchange, is cooled in the cooling tower 11.

This air cycle refrigerating/cooling system is a system where the space to be cooled 10 is kept between approximately 0° C. and −60° C., and air at approximately 0° C. to −60° C. under 1 normal atmosphere (1 atm) flows into the inlet 1a of the air circulation path 1 from the space to be cooled 10. Here, the numerals of the temperature and the air pressure shown in the following are examples which tentatively become a rough standard. The air that has flown into the inlet 1a is used by the intermediate heat exchanger 9 to cool the air in the rear stage of the air circulation path 1, and thus, the temperature rises to 30° C. The air of which the temperature has thus risen stays at 1 normal atmosphere, but is then compressed by the pre-compressing unit 2 to 1.4 normal atmosphere, and the temperature rises to 70° C. as a result of this compression. The first heat exchanger 3 only cools the air of which the temperature has risen to 70° C., and therefore can efficiently cool the air with cold water of which the temperature is approximately room temperature, and thus, cools the air to 40° C. The dehumidifier 4 dehumidifies the air inside the path in order to prevent the moisture in the air within the air circulation path 1 from being cooled to a subzero temperature in the rear stage, which causes clogging in the air circulation path 1 or dragging of the expansion turbine 7.

The air at 40° C. of which the pressure is 1.4 normal atmosphere after dehumidification is compressed by the compressor 6 in the turbine unit 5 to 1.8 normal atmosphere so that the air becomes of a state where the temperature has risen to approximately 70° C. as a result of this compression, and then cooled to 40° C. by the second heat exchanger 8. This air at 40° C. is cooled to −20° C. by air at −30° C. in the intermediate heat exchanger 9. The air pressure is maintained at 1.8 normal atmosphere as the air is discharged from the compressor 6.

The air that has been cooled to −20° C. in the intermediate heat exchanger 9 is adiabatically expanded by the expansion turbine 7 in the turbine unit 5 so as to be cooled to −55° C., and then discharged to the space to be cooled 10 from the outlet 1b. This air cycle refrigerating/cooling system carries out such a refrigerating cycle.

FIG. 2 shows an example of a turbine unit 5 for air cycle refrigerating/cooling. This turbine unit 5 has a compressor 6 and an expansion turbine 7 where the compressor rotor 6a of the compressor 6 and the turbine rotor 7a of the expansion turbine 7 are respectively attached to either end of the main shaft 13. In addition, the power generated by the turbine rotor 7a drives the compressor rotor 6a, and no other drive source is provided.

Here, as described in the following in reference to FIG. 8, the compressor rotor 6a of the compressor 6, the turbine rotor 7a of the expansion turbine 7 and the motor rotor 92 may be attached to the same main shaft 13 so that the main shaft 13 is driven by the drive force of the motor 90. In the case where the motor 90 is provided so as to drive the main shaft 13, it becomes unnecessary to provide a pre-compressing unit 2 (FIG. 1), such as a blower, in the stage before the compressor 6.

In FIG. 2, the compressor 6 has a housing 6b which faces the compressor rotor 6a via a microscopic gap d1, and the air that has been taken in from an intake 6e in the center portion in the axial direction is compressed by the compressor rotor 6a and discharged from the outlet (not shown) in the outer peripheral portion, as shown by arrow 6d.

The expansion turbine 7 has a housing 7b which faces the turbine rotor 7a via a microscopic gap d2, and the air that has been taken in from the outer peripheral portion, as shown by arrow 7c, is adiabatically expanded by the turbine rotor 7a and discharged in the axial direction from the outlet 7d in the center portion.

In this turbine unit 5, the main shaft 13 is supported by a number of bearings 15 and 16 in the direction of the radii, and the thrust force applied to the main shaft 13 is supported by an electromagnet 17. This turbine unit 5 has a sensor 18 for detecting the thrust force which affects the main shaft 13 through the air inside the compressor 6 and the expansion turbine 7 and a controller 19 for controlling the support force by the above described electromagnet 17 on the basis of the output of this sensor 18. The electromagnet 17 is installed in a spindle housing 14 so as to face but not make contact with the two surfaces of a thrust plate 13a in flange form made up of a ferromagnetic body provided at the center of the main shaft 13.

The bearings 15 and 16 for supporting the main shaft 13 are rolling contact bearings having a function of restricting movement in the axial direction and, for example, deep groove ball bearings are used. Deep groove ball bearings have a function of supporting the thrust in the two directions and work to return the inner and outer rings to the neutral location in the axial direction. These two bearings 15 and 16 are placed in close proximity to the compressor rotor 6a and the turbine rotor 7a in the spindle housing 14, respectively.

The bearing 16 on the side where the above described sensor 18 is installed is fitted into a bearing housing 23, which is fitted into the spindle housing 14.

The main shaft 13 is a shaft with steps having a large diameter portion 13b in the center portion and small diameter portions 13e in the two end portions. The bearings 15 and 16 on both sides have inner rings 15a and 16a, into which the small diameter portions 13c are fitted in a press fitting state, and one end face making contact with a surface on the step between the large diameter portion 13b and a small diameter portion 13c.

The portions of the spindle housing 14 on the rotors 6a and 7a sides of the bearings 15 and 16 on the two sides are formed so as to have a diameter in such a manner that the inner surface is in close proximity to the main shaft 13, and non-contact seals 21 and 22 are formed on this inner surface. The non-contact seals 21 and 22 are labyrinth seals which are formed by aligning a number of circumferential trenches in the inner surface of the spindle housing 14 in the axial direction.

The turbine unit 5 having this configuration compresses the air which becomes the coolant in the air cycle refrigerating/cooling system with the compressor 6 so that the temperature rises and is used in order for the air that has been cooled in the heat exchangers 8 and 9 to be cooled to a target temperature, that is, a very low temperature, for example, approximately −30° C. to −60° C., through adiabatic expansion in the expansion turbine 7 and then discharged.

The compressor rotor 6a and the turbine rotor 7a are attached to the same main shaft 13, and the power generated by the turbine rotor 7a drives the compressor rotor 6a in this turbine unit 5, which requires no power source and can efficiently cool with a compact configuration.

In order to secure the efficiency in compression and expansion of this turbine unit 5, it is necessary to keep the gaps d1 and d2 between the rotors 6a and 7a and the housings 6b and 7b microscopic. It becomes important for the air cycle refrigerating/cooling system to secure this efficiency. As a means for achieving this, the main shaft 13 is supported by rolling contact type bearings 15 and 16, and therefore, the movement of the main shaft 13 in the axial direction is restricted to a certain degree due to the function of the rolling contact bearings of restricting movement in the axial direction, and thus, microscopic gaps d1 and d2 between the respective rotors 6a and 7a and the housings 6b and 7b can be kept at a constant distance.

However, a thrust force is applied to the main shaft 13 of the turbine unit 5 through the air pressure which affects the respective rotors 6a and 7a. In addition, the turbine unit 5 used in the air cooling system provides rotations at a very high speed, for example, approximately 80,000 to 100,000 rotations per minute. Therefore, when a thrust force affects the rolling contact bearings 15 and 16 which support the rotating main shaft 13 as described above, the durability of the bearings 15 and 16 is lowered.

In this embodiment, the above described thrust force is supported by the electromagnet 17, and therefore, the thrust force which affects the rolling contact bearings 15 and 16 for supporting the main shaft 13 can be reduced while preventing the torque from increasing without any contact. In this case, a sensor 18 for detecting a thrust force which affects the main shaft 13 through the air within the compressor 6 and the expansion turbine 7, and a controller 19 for controlling the supporting force with the above described electromagnet 17 on the basis of the output of this sensor 18 are provided, and therefore, the rolling contact bearings 15 and 16 can be used in such a state as to be optimal for the thrust force in accordance with the specification of these bearings.

In particular, the sensor 18 is placed in close proximity to the bearing 16, and therefore, the thrust force which affects the bearing 16, which may cause a problem, can be directly measured with a high precision, and thus, precise control over the thrust force becomes possible.

Therefore, stable high speed rotations of the main shaft 13 can be attained while keeping appropriate gaps d1 and d2 vis-à-vis the respective rotors 6a and 7a, and the durability and the life of the bearings 15 and 16 can be increased. The durability of the bearings 15 and 16 increases, and therefore, as a whole, the reliability of the turbine unit 5 for air cycle refrigerating/cooling increases, and thus, as a whole, the reliability of the air cycle refrigerating/cooling system increases. In this manner, the stability of high speed rotations, the durability and the reliability of the main shaft bearings 15 and 16 in the turbine unit 5, which becomes an obstacle in the air cycle refrigerating/cooling system, increase, and therefore, it becomes possible to put the air cycle refrigerating/cooling system into practice.

The bearings 15 and 16 are placed in close proximity to the compressor rotor 6a and the turbine rotor 7a, respectively, so that the main shaft 13 is supported at both ends, and therefore, a more stable high rotation becomes possible.

Non-contact seals 21 and 22 are provided to the portions between the main shaft 13 and the spindle housing 14 on the end portion sides of the respective bearings 15 and 16, and therefore, air can be prevented from passing through the bearings 15 and 16 and leaking between the compressor 6 and the expansion turbine 7. The difference in the air pressure between the inside of the compressor 6 and the inside of the expansion turbine 7 is great, and therefore, air tends to leak after passing through the inside of the respective bearings 15 and 16 and along the surface where the inner and outer rings 15a and 16a of the respective bearings 15 and 16 make contact with the main shaft 13 and the spindle housing 14. This air leakage lowers the efficiency of the compressor 6 and the expansion turbine 7, and there is a risk that the air that passes through the bearings 15 and 16 may make the inside of the bearings 15 and 16 dirty, in the case where there is dust, and the lubricant inside the bearings dry, and thus, may lower durability. Such a reduction in the efficiency and dirtiness of the bearings 15 and 16 can be prevented by the above described non-contact seals 21 and 22.

Figure 3:
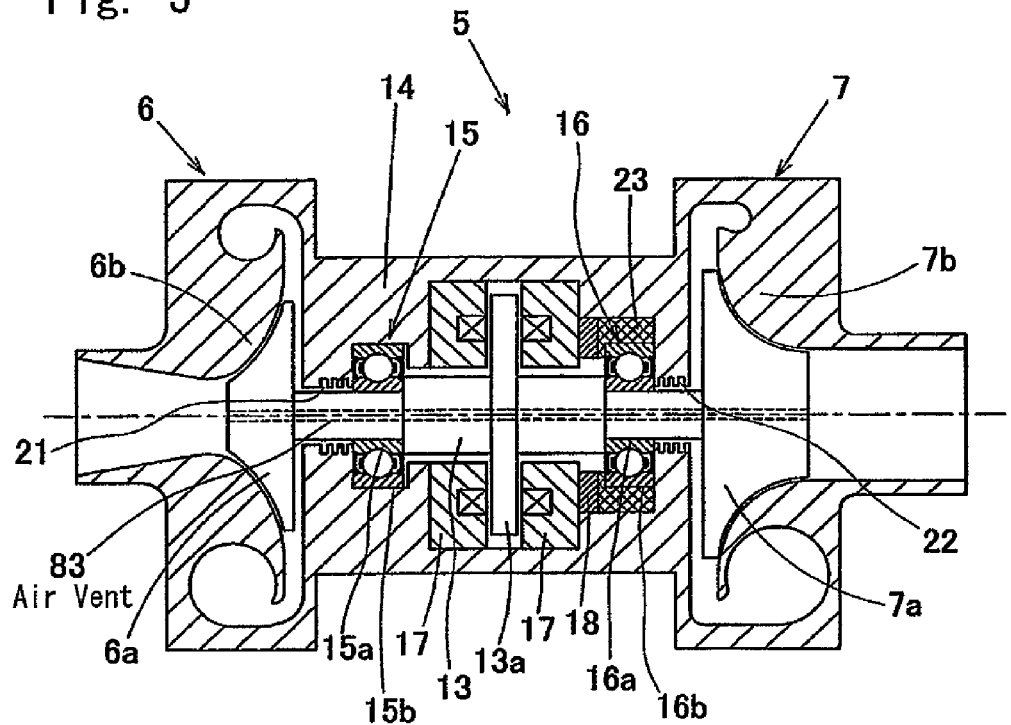
FIG. 3 is a cross sectional diagram showing a turbine unit for air cycle refrigerating/cooling used in the air cycle refrigerating/cooling system according to the second embodiment.

The drawings of FIG. 3 and onwards show other embodiments according to this invention. The configurations and the effects of the respective embodiments of FIG. 3 and onwards are the same as those of the embodiment of FIG. 2, except for the particularly described matters, and the same symbols are attached to the corresponding parts and the same descriptions are omitted.

FIG. 3 shows the turbine unit 5 according to the second embodiment of this invention. In this turbine unit 5, the main shaft 13 is hollow so that the output side of the expansion turbine 7 and the input side of the compressor 6 are connected to each other via an air vent 83, which becomes a bearing cooling air guiding path within this main shaft 13.

In the case where the air vent 83 is provided within the main shaft 13, the main shaft 13 is cooled by the air which passes through the air vent 83 so that the bearings 15 and 16, of which the temperature becomes high as a result of high speed rotation, are cooled by heat conductance through the main shaft 13. As a result, the durability of the bearings 15 and 16 is increased.

Figure 4:
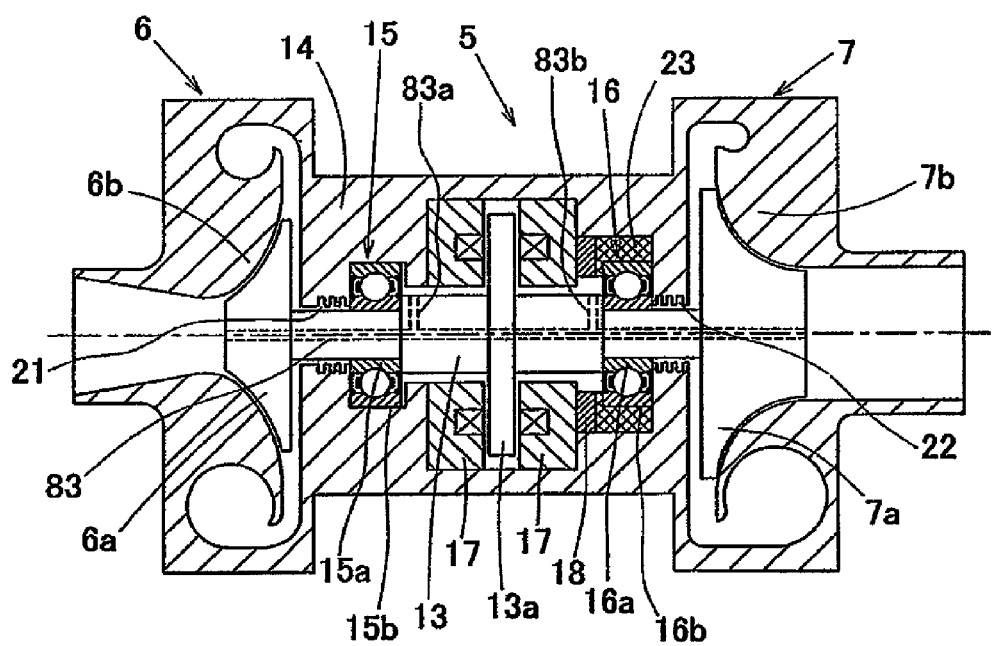
FIG. 4 is a cross sectional diagram showing a turbine unit for air cycle refrigerating/cooling used in the third embodiment.

Branching paths 83a and 83b having openings on the outer peripheral surface of the main shaft 13 in close proximity to the respective bearings 15 and 16 may be provided to the air vent 83 which passes through the main shaft 13 as in the third embodiment shown in FIG. 4. In the case where these branching paths 83a and 83b are provided, the bearings 15 and 16 are directly cooled by the air that flows through the branching paths 83a and 83b, and thus, the efficiency in cooling the bearings 15 and 16 is increased.

Figure 5:
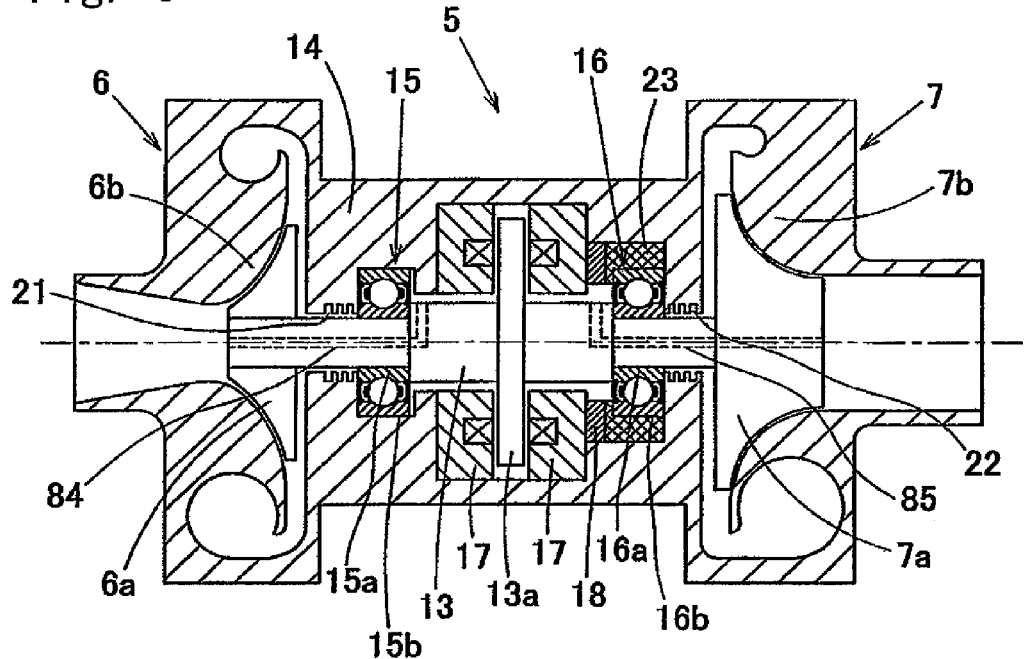
FIG. 5 is a cross sectional diagram showing a turbine unit for air cycle refrigerating/cooling used in the fourth embodiment.

FIG. 5 shows the turbine unit 5 according to the fourth embodiment. This turbine unit 5 is provided with a bearing cooling air guiding path 84 which starts at the end of the main shaft 13 on the compressor rotor 6a side and has an opening at the center portion on the main shaft of the bearing 15 in close proximity to the compressor rotor 6a side and a bearing cooling air guiding path 85 which starts at the end of the main shaft 13 on the turbine rotor 7a side and has an opening at the center portion of the main shaft on the bearing 16 in close proximity to the turbine rotor 7a side.

In the case of this configuration, air within the compressor 6 flows into a portion in close proximity to the bearing 15 on the compressor 6 side via the bearing cooling air guiding path 84 so as to cool this bearing 15 in addition to the bearing 16, and after that, is discharged to the expansion turbine side via the bearing cooling air guiding path 85.

Figure 6:
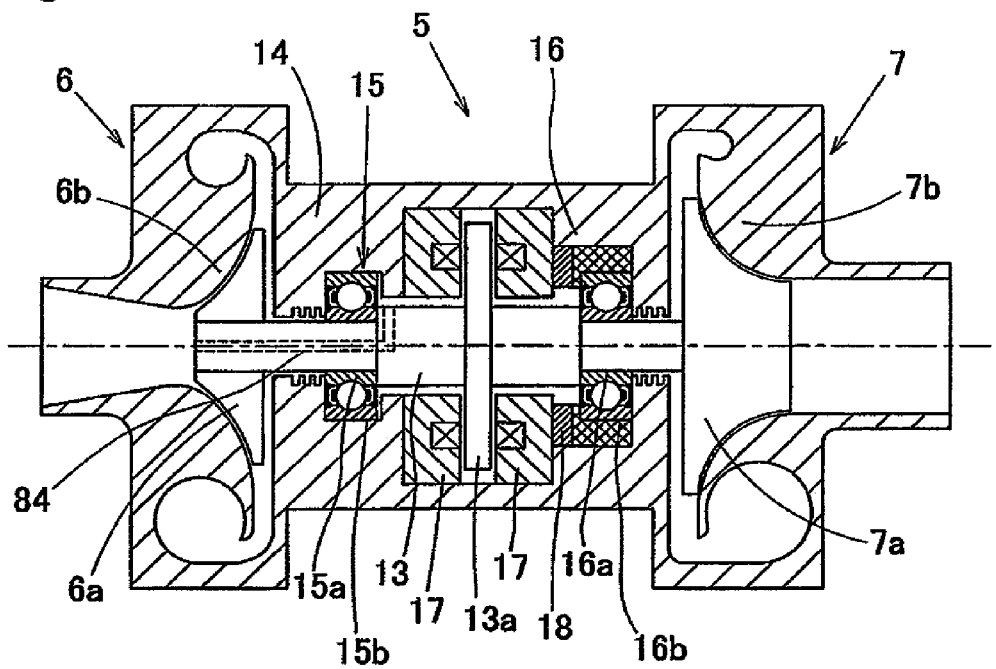
FIG. 6 is a cross sectional diagram showing a turbine unit for air cycle refrigerating/cooling used in the fifth embodiment.

Here, the portion in the vicinity of the expansion turbine 7 is at a relatively low temperature, and therefore, the temperature of the bearing 16 can be prevented from rising when rotating at a high speed. Accordingly, the above described bearing cooling air guiding path 84 may be provided only on the compressor 6 side as in the fifth embodiment shown in FIG. 6.

Figure 7:
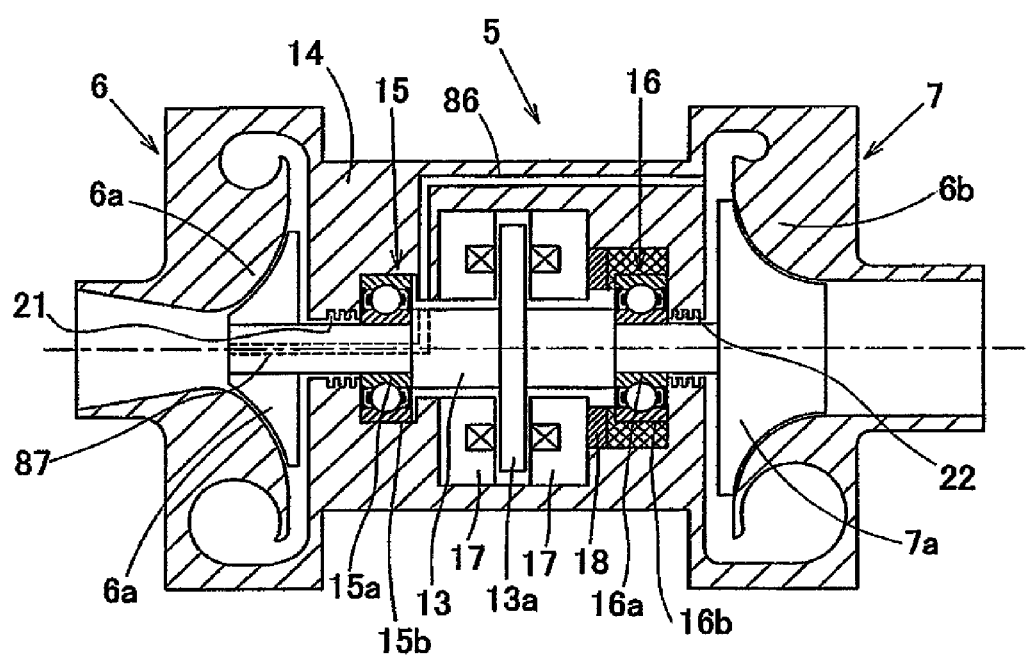
FIG. 7 is a cross sectional diagram showing a turbine unit for air cycle refrigerating/cooling used in the sixth embodiment.

FIG. 7 shows the turbine unit 5 according to the sixth embodiment. In this turbine unit 5, a bearing cooling air guiding path 86 for making air in the inlet portion of the expansion turbine 7 flow to the portion in the vicinity of the bearing on the compressor 6 side is provided within the spindle housing 14. In addition, a flow out path 87 for making this guided air flow to the inlet side of the compressor 6 is provided within the main shaft 13.

The pressure in the inlet portion of the expansion turbine 7 is the pressure after compression by the compressor 6, and therefore, it is higher than the pressure in the inlet portion of the compressor 6. As a result, air flows in through the above described bearing cooling air guiding path 86 and flows out through the flow out path 87. The air in the inlet portion of the expansion turbine 7 is the air that has been cooled via the second heat exchanger 8 and the intermediate heat exchanger 9 in FIG. 1, and the temperature thereof is as low as, for example, approximately −40° C. The bearing 15 on the compressor 6 side is cooled by this low temperature air, and therefore, the bearing 15 on the compressor side, of which the temperature tends to become high due to high speed rotation, can be cooled efficiently so that the durability can be increased.

Figure 8:
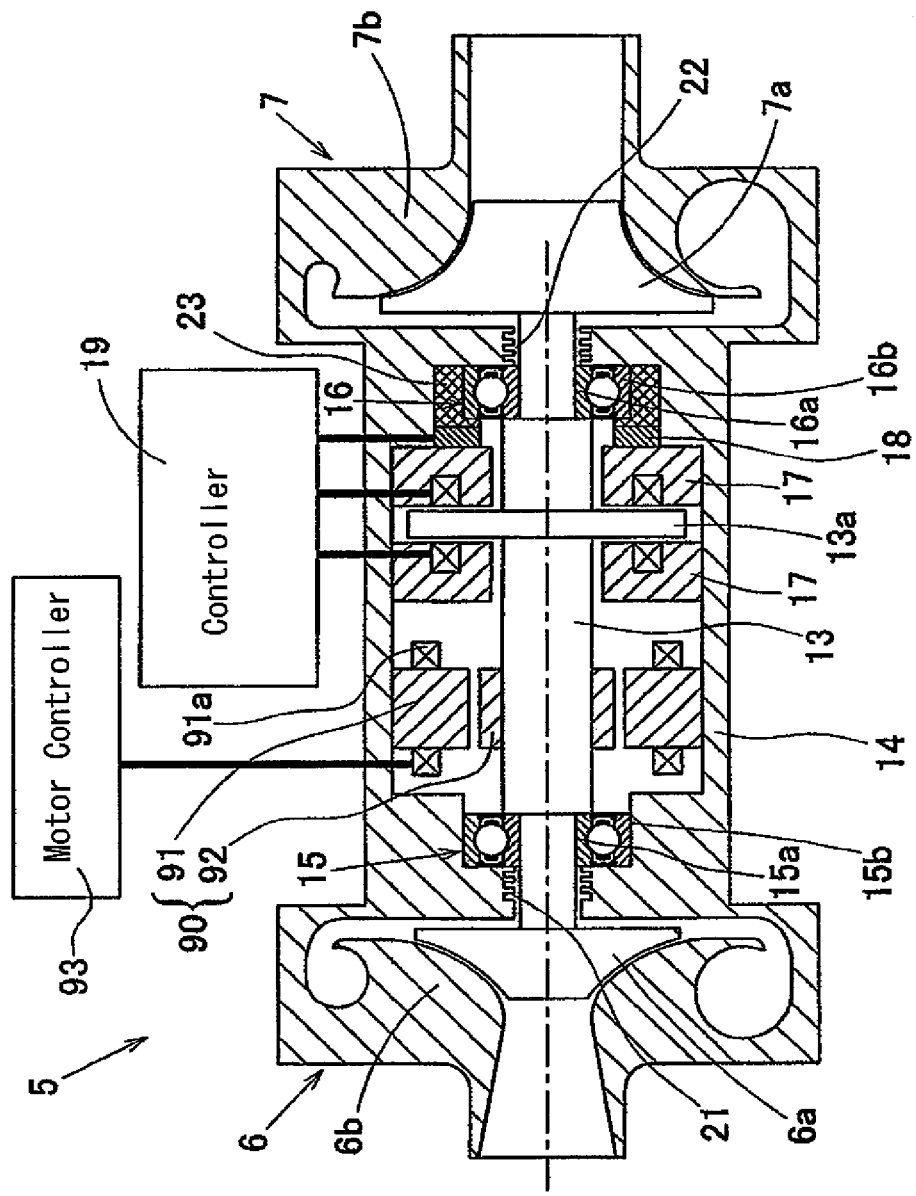
FIG. 8 is a cross sectional diagram showing a turbine unit for air cycle refrigerating/cooling used in the seventh embodiment.

FIG. 8 shows the turbine unit 5 according to the seventh embodiment. This turbine unit 5 is provided with a motor 90 for rotating and driving the main shaft 13. The motor 90 is provided with an electromagnet 17 next to it and formed of a stator 91 provided in the spindle housing 14 and a rotor 92 provided on the main shaft 13. The stator 91 has a stator coil 91a, and the rotor 92 is made up of a magnet or the like. The motor 90 is controlled by a motor controller 93.

In this turbine unit 5, the drive force of the turbine rotor 7a generated by the expansion turbine 7 and the drive force generated by the motor 90 rotate and drive the compressor rotor 6a. Therefore, it becomes possible to drive the compressor 6 without the pre-compressing unit 2 made up of the blower in FIG. 1, and thus, the system can be made compact.

Figure 9:
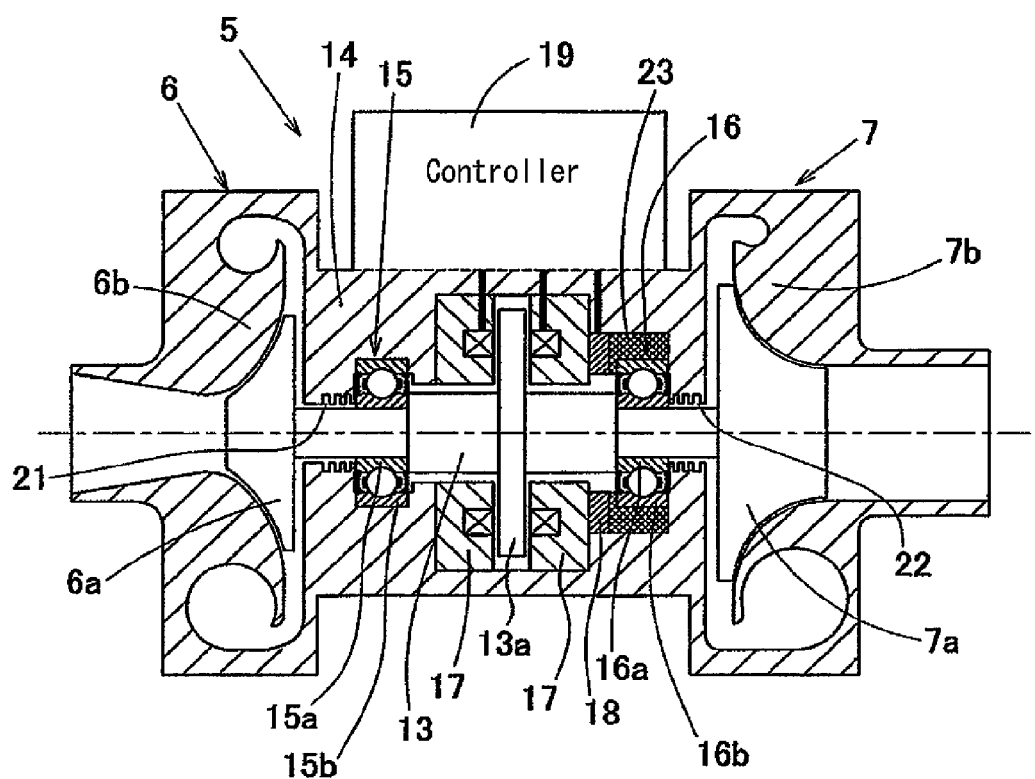
FIG. 9 is a cross sectional diagram showing a turbine unit for air cycle refrigerating/cooling used in the eighth embodiment.

FIG. 9 shows the turbine unit 5 according to the eighth embodiment. In the configuration of this structure, a controller 19 is built into this turbine unit 5. In this configuration, cables between the controller 19 and the electromagnet 17 as well as between the controller 19 and the sensor 18 can be made short, and at the same time, connections can be made simple, and therefore, it is advantageous in terms of cost, and at the same time, the entirety of the configuration of the system with a sensor circuit connected to the outside can be made compact.

Figure 10:
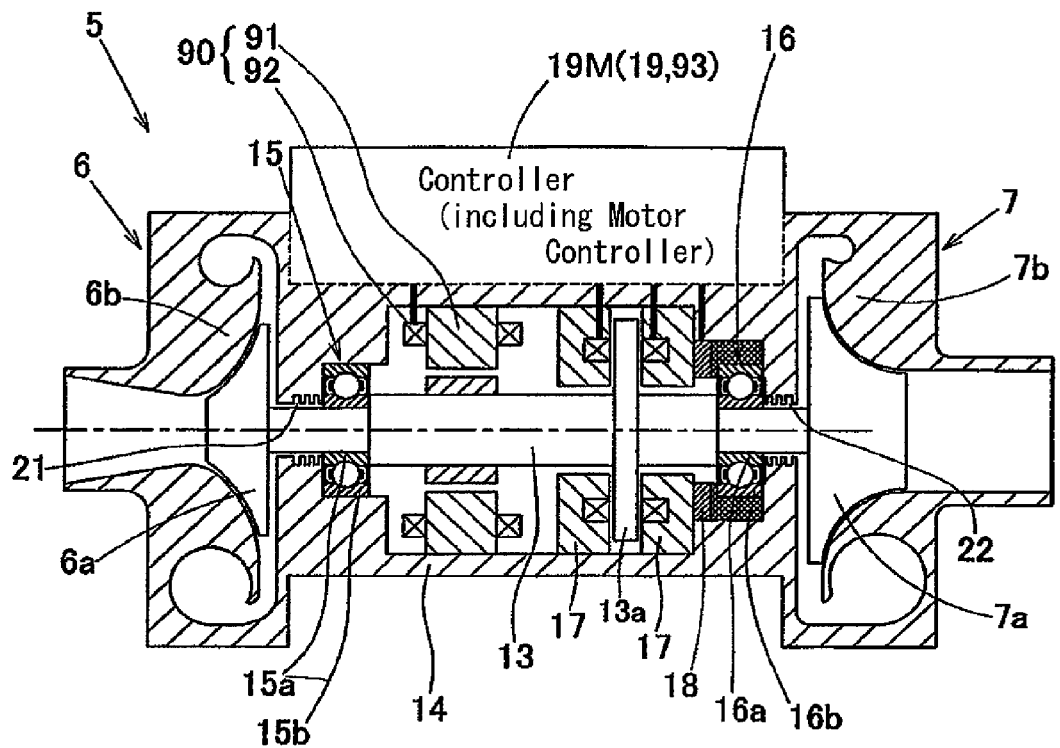
FIG. 10 is a cross sectional diagram showing a turbine unit for air cycle refrigerating/cooling used in the ninth embodiment.

As in the ninth embodiment shown in FIG. 10, in the configuration where the motor 90 is provided inside the turbine unit 5, a controller 19M is built into the turbine unit 5, and thus, cables between the motor 90 and the controller 19M also become necessary, and therefore, the configuration where the controller 19M is built into the turbine unit 5 in this manner becomes more advantageous. Here, the controller 19M according to this embodiment includes the above described controller 19 and motor controller 93.

A configuration where a communication line in addition to a power line is connected from the outside is adopted for this controller 19M, and thus, it also becomes possible to change the state of operation of the electromagnet 17 from the outside. In the case where the main shaft 13 is not rotating, for example, the configuration allows a control signal from the outside to prevent a current from flowing through the electromagnet 17, and thus, an unnecessary supply of power to the turbine unit 5 can be avoided, making it possible to achieve energy conservation. In addition, the output of the sensor 18 is sent to the outside through the communication line, and thus, it also becomes possible to monitor the state of the turbine unit from the outside on the basis of this sensor output.

Here, though the electromagnet 17 facing the thrust plate 13a of the main shaft 13 is provided in the above described and below described embodiments, a permanent magnet (not shown) may be provided in addition to the electromagnet 17. In addition, though this deviates from the present invention, the thrust force of the main shaft 13 can be supported only by a permanent magnet in the case where it is unnecessary to control the thrust force.

Figure 11:
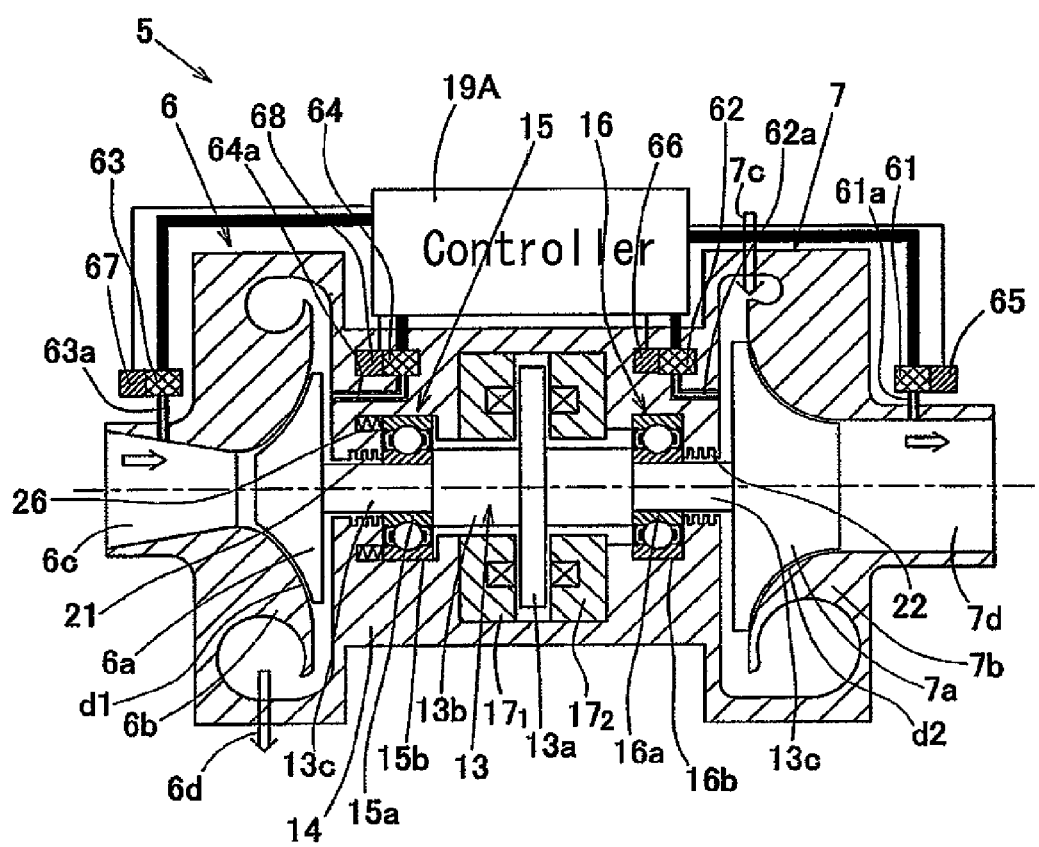
FIG. 11 is a cross sectional diagram showing a turbine unit for air cycle refrigerating/cooling according to the tenth embodiment.
Figure 12:
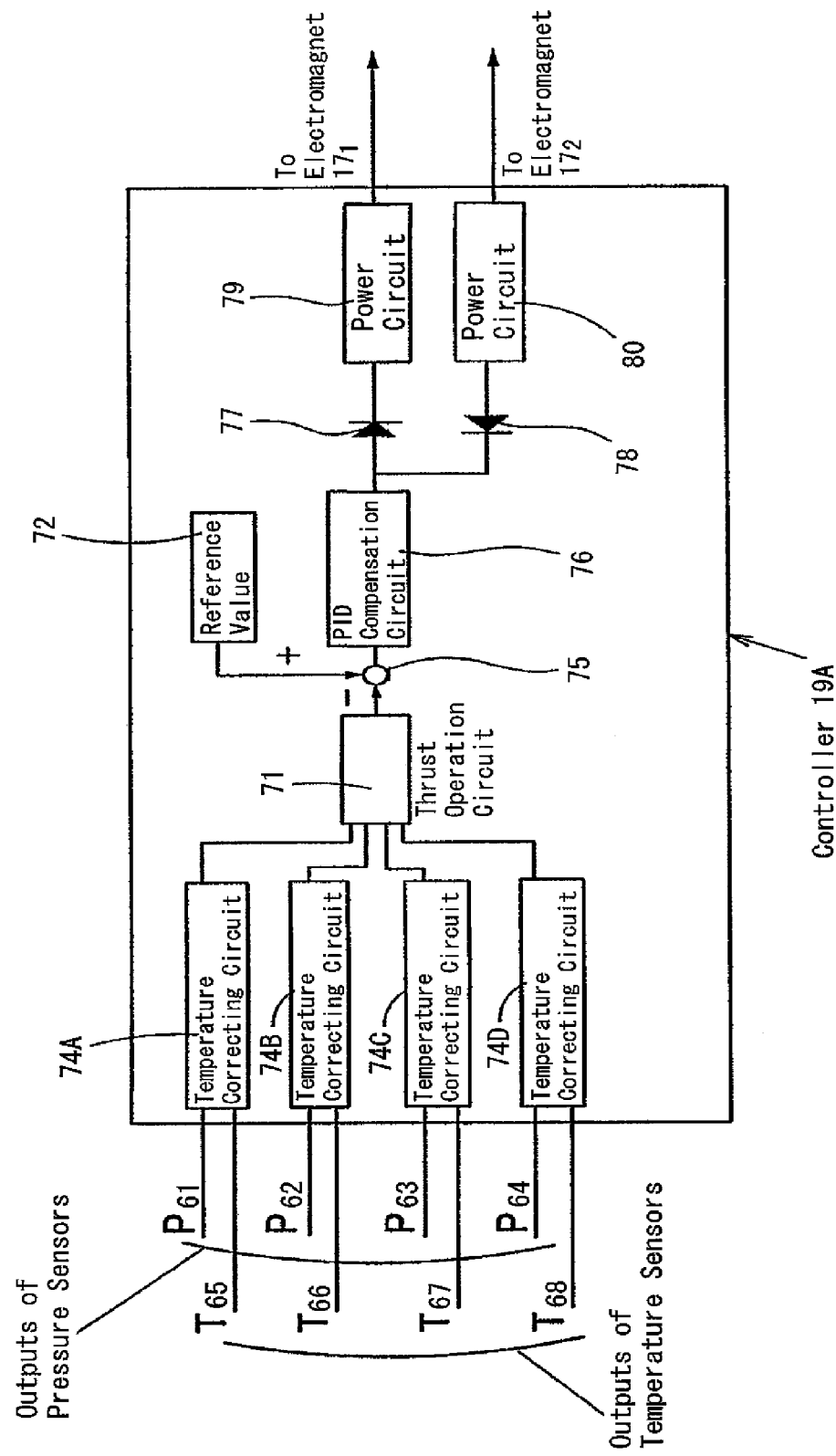
FIG. 12 is a block diagram showing an example of a controller used in the turbine unit.

Next, the turbine unit for air cycle refrigerating/cooling according to the tenth embodiment of this invention is described in reference to FIGS. 11 and 12. The air cycle refrigerating/cooling system where this turbine unit for air cycle refrigerating/cooling is used is the same as described above in reference to FIG. 1.

FIG. 11 shows an example of a turbine unit 5 for air cycle refrigerating/cooling. This turbine unit 5 has a compressor 6 and an expansion turbine 7, and the compressor rotor 6a of the compressor 6 and the turbine rotor 7a of the expansion turbine 7 are attached to both ends of the main shaft 13, respectively. In addition, the power generated by the turbine rotor 7a drives the compressor rotor 6a, and no other drive source is provided.

Figure 14:
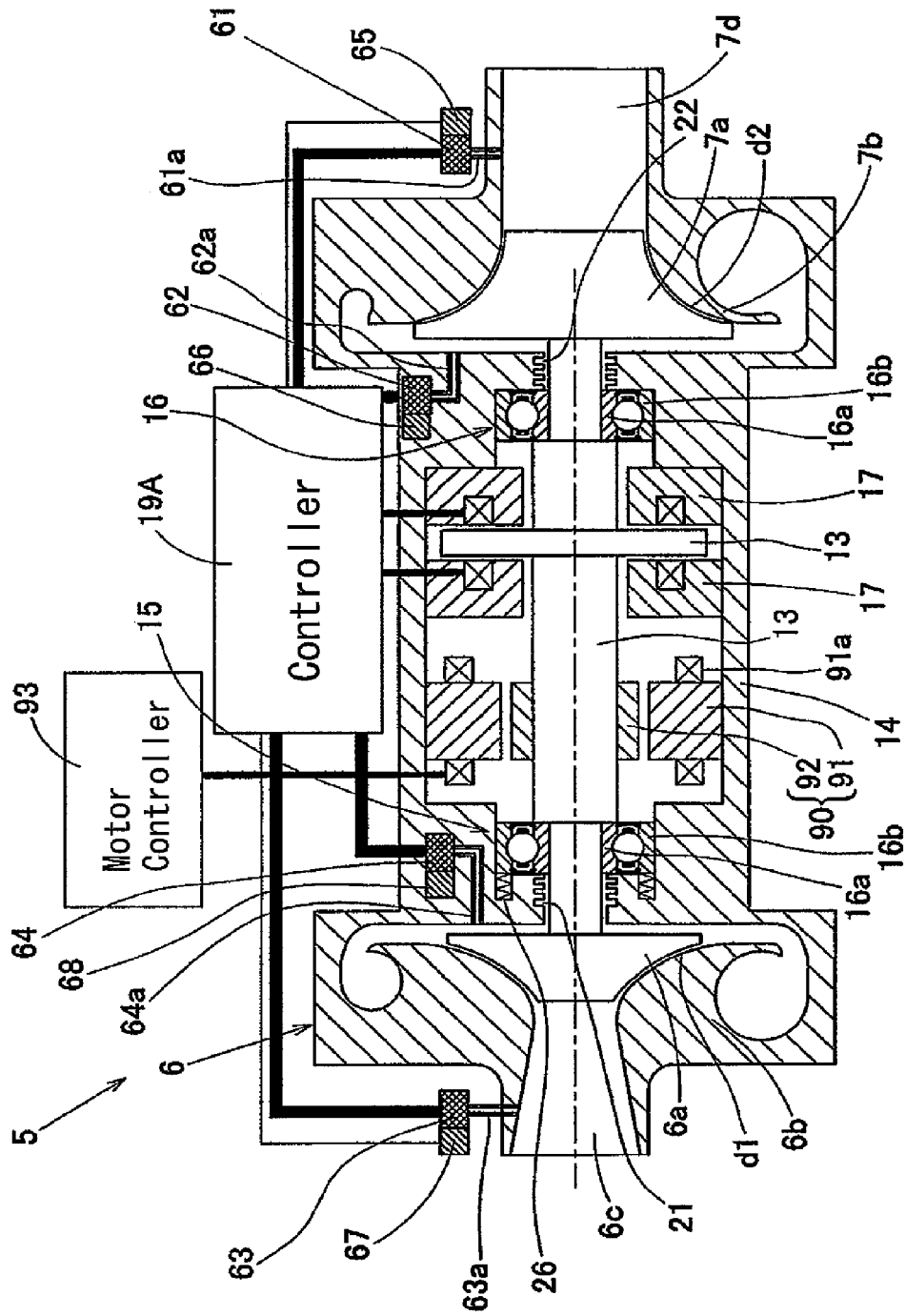
FIG. 14 is a cross sectional diagram showing a turbine unit for air cycle refrigerating/cooling according to the twelfth embodiment.

Here, as in the twelfth embodiment shown in FIG. 14, the compressor rotor 6a of the compressor 6, the turbine rotor 7a of the expansion turbine 7 and the motor rotor 92 may be attached to the same main shaft 13 so that the drive force of the motor 90 drives the main shaft 13. The motor 90 is made up of a stator 91, which has a stator coil 91a and is installed in the spindle housing 14, and the above described motor rotor 92 and controlled by the motor controller 93. In the case where the motor 90 is provided to drive the main shaft 13, it becomes unnecessary to provide a pre-compressing unit 2 (FIG. 1), such as a blower, in the stage before the compressor 6.

In FIG. 11, the compressor 6 has a housing 6b which faces the compressor rotor 6a via a microscopic gap d1, compresses the air that has been taken in from the intake 6c in the center portion in the axial direction with the compressor rotor 6a, and discharges the air through the outlet (not shown) in the outer peripheral portion as shown by arrow 6d.

The expansion turbine 7 has a housing 7b which faces the turbine rotor 7a via a microscopic gap d2, adiabatically expands the air that has been taken in from the outer peripheral portion as shown by arrow 7c with the turbine rotor 7a, and discharges the air in the axial direction through the outlet 7d in the center portion.

In this turbine unit 5, the main shaft 13 is supported by a number of bearings 15 and 16 in the direction of the radii and the thrust force applied to the main shaft 13 is supported by the electromagnet 17 ($17_1$, $17_2$). The below described pressure sensors 61 to 64 are provided in this turbine unit 5 as an air pressure detecting unit for detecting the thrust force which affects the main shaft 13 through the air inside the compressor 6 and the expansion turbine 7, and a controller 19A for controlling the support force of the above described electromagnet 17 in accordance with an estimated value of the thrust force, which is found through an arithmetic operation on the outputs of these pressure sensors 61 to 64, is provided. The electromagnet 17 is installed in the spindle housing 14 so as to face but not make contact with the two surfaces of the thrust plate 13a in flange form made up of a ferromagnetic body provided at the center of the main shaft 13.

The bearings 15 and 16 for supporting the main shaft 13 are rolling contact bearings having a function of restricting movement in the axial direction and, for example, deep groove ball bearings are used. Deep groove ball bearings have a function of supporting the thrust in the two directions and work to return the inner and outer rings to the neutral location in the axial direction. These two bearings 15 and 16 are placed in close proximity to the compressor rotor 6a and the turbine rotor 7a in the spindle housing 14, respectively.

The main shaft 13 is a shaft with steps having a large diameter portion 13b in the center portion and small diameter portions 13c in the two end portions. The bearings 15 and 16 on both sides have inner rings 15a and 16a, into which the small diameter portions 13c are fitted in a press fitting state, and one end face making contact with a surface on the step between the large diameter portion 13b and a small diameter portion 13c.

The portions of the spindle housing 14 on the rotors 6a and 7a sides of the bearings 15 and 16 on the two sides are formed so as to have a diameter in such a manner that the inner surface is in close proximity to the main shaft 13, and non-contact seals 21 and 22 are formed on this inner surface. The non-contact seals 21 and 22 are labyrinth seals which are formed by aligning a number of circumferential trenches in the inner surface of the spindle housing 14 in the axial direction.

From among the above described bearings 15 and 16, the outer ring 16a of the bearing 16 on the turbine rotor 7a side is installed so as to be immovable in the axial direction relative to the spindle housing 14. The bearing on the compressor rotor 6a side is installed inside the hole of which the diameter is the inner diameter of the spindle housing 14 so as to be elastically and freely moveable in the axial direction by means of a resilient element 26. The resilient element 26 works to press the bearing 15 against the above described surface of the step in the main shaft 13, and thus, provides preload to the bearing 15.

The above described pressure sensors 61 to 64 detect the pressure of the expansion turbine 7 on the output side, the back pressure of this turbine rotor 7a, the pressure of the compressor 6 on the input side and the back pressure of the compressor rotor 6a, respectively. These pressure sensors 61 to 64 are installed inside or outside the spindle housing 14, and air pressure guiding paths 61a to 64a, such as pipes, for guiding the air pressure at each detection portion to the corresponding pressure sensor 61 to 64 are provided.

The air pressure guiding path 61a for the pressure sensor 61 has an opening in the outlet 7d of the expansion turbine 7, and the air pressure guiding path 62a for the pressure sensor 62 has an opening on the inner surface of the spindle housing 14 which faces the back surface of the turbine rotor 7a.

The air pressure guiding path 63a of the pressure sensor 63 has an opening in the intake 6c of the compressor 6, and the air pressure guiding path 64a for the pressure sensor 64 has an opening on the inner surface of the spindle housing 14 which faces the back surface of the compressor rotor 6a.

Here, it is not necessary to provide all of the above described pressure sensors 61 to 64 in four locations, and at least one pressure sensor 61 to 64 may be provided in one place.

Temperature sensors 65 to 68 are provided in the vicinity of the pressure sensors 61 to 64, respectively. The outputs of the above described pressure sensors 61 to 64 and temperature sensors 65 to 68 are inputted into the controller 19A.

FIG. 12 is a block diagram showing the controller 19A in the turbine unit 5 in FIG. 11. The outputs $P_{61}$ to $P_{64}$ detected by the respective pressure sensors 61 to 64 in FIG. 11 and the outputs $T_{65}$ to $T_{68}$ of the temperature sensors 65 to 68 in FIG. 1 are inputted into temperature compensation circuits 74A to 74D, and the outputs $P_{61}$ to $P_{64}$ from the respective pressure sensors 61 to 64 are inputted into a thrust force estimating operation circuit 71 after temperature compensation has been carried out. The estimation output of the thrust force which affects the main shaft 13 from this thrust force estimating operation circuit 71 is compared with the reference value of the reference value setting unit 72 in the comparison portion 75 so that the deviation is calculated.

The above described deviation that has been calculated is processed through proportion, differentiation and integration operations which are appropriately set in accordance with the turbine unit 5 by a PID compensation circuit 76.

The output of the PID compensation circuit 76 is inputted into power circuits 79 and 80 for driving electromagnets $17_1$ and $17_2$ in the respective directions via diodes 77 and 78. The electromagnets $17_1$ and $17_2$ are a pair of electromagnets 17 which face the thrust plate 13a shown in FIG. 11 and only provide an attracting force, and therefore, the direction of the current is determined in advance by the diodes 77 and 78 so that the two electromagnets $17_1$ and $17_2$ can be driven selectively.

Figure 13:
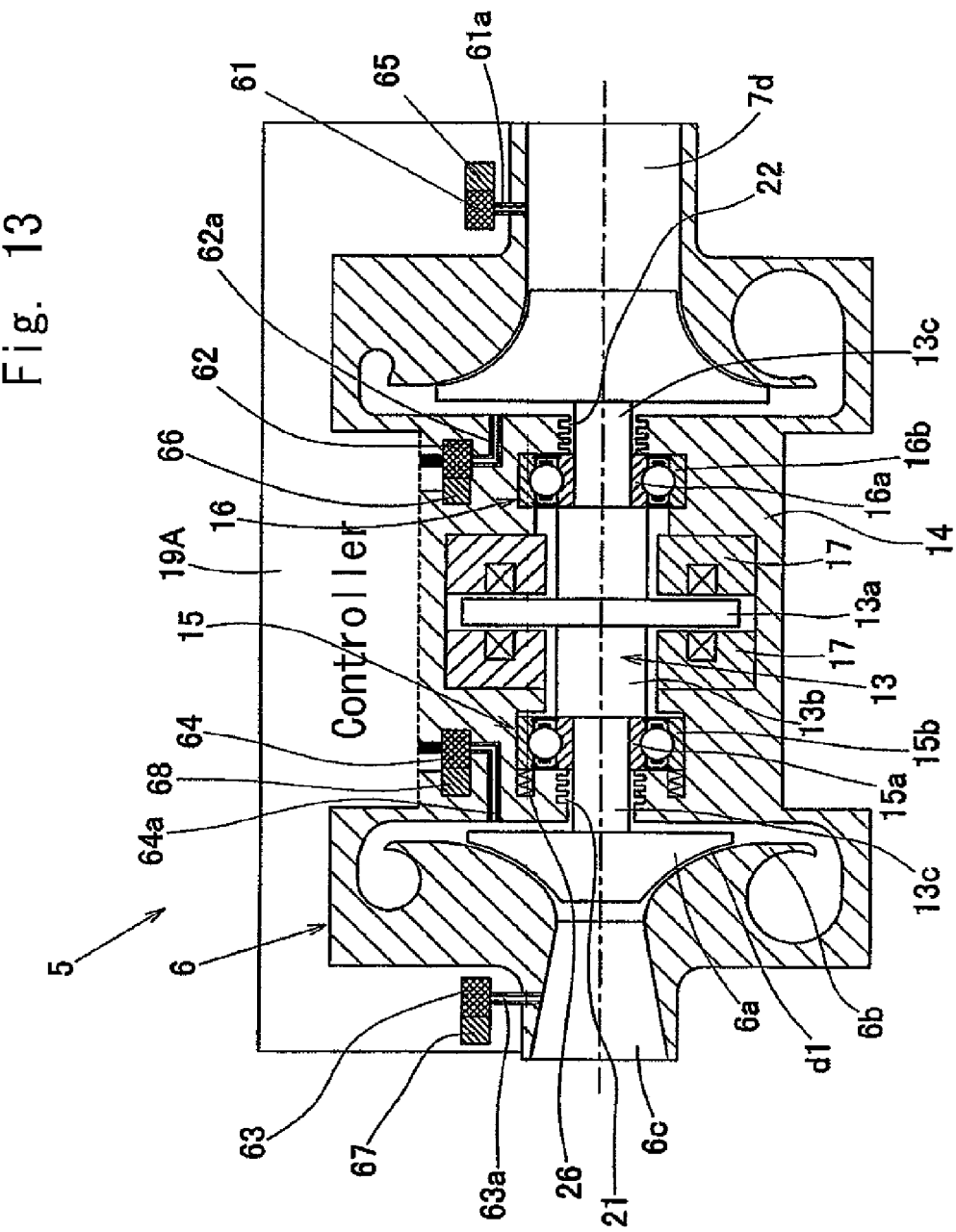
FIG. 13 is a cross sectional diagram showing a turbine unit for air cycle refrigerating/cooling according to the eleventh embodiment.

FIG. 13 shows the turbine unit 5 according to the eleventh embodiment. In the configuration of this structure, a controller 19A is built into this turbine unit 5. In this configuration, cables between the controller 19A and the electromagnets 17 as well as between the controller 19A and the sensors 61 to 68 can be made short, and at the same time, connections can be made simple, and therefore, it is advantageous in terms of cost, and at the same time, the entirety of the configuration of the system with a sensor circuit connected to the outside can be made compact.

In a configuration where the motor 90 is provided within the turbine unit 5 as in the example in FIG. 14, cables between the motor 90 and its controller 93 also become necessary, and therefore, the above described configuration where the controller 19A is built into the turbine unit becomes more advantageous, though not shown. In this case, the motor controller 93 is also built into the turbine unit 5.

The working effects of the above described configuration are described below. The turbine unit 5 having this configuration in the air cycle refrigerating/cooling system is used to cool the air that becomes the coolant, which has been compressed by the compressor 6 so that the temperature is raised in order for the heat to be efficiently exchanged by the heat exchangers 8 and 9 (FIG. 1) and has been cooled in the heat exchangers 8 and 9, to a target temperature, that is, a very low temperature of, for example, approximately −30° C. to −60° C. by the expansion turbine 7 through adiabatic expansion and discharge the air.

This turbine unit 5 where the compressor rotor 6a and the turbine rotor 7a are attached to the same main shaft 13 drives the compressor rotor 6a with the power generated by the turbine rotor 7a, and therefore, requires no power source and can efficiently cool in a compact configuration.

In order to secure the efficiency in the compression and expansion of this turbine unit 5, it is necessary to keep the respective gaps d1 and d2 between the rotor 6a and the housing 6b as well as between the rotor 7a and the housing 7b microscopic. In the air cycle refrigerating/cooling system, it becomes important to secure the efficiency in this manner. In order to do so, the main shaft 13 is supported by rolling contact bearings 15 and 16 so that the position of the main shaft 13 is restricted to a certain degree due to the function of restricting movement in the axial direction by the rolling contact bearings, and thus, the respective microscopic gaps d1 and d2 between the rotor 6a and the housing 6b as well as between the rotor 7a and the housing 7b can be kept constant.

However, a thrust force is applied to the main shaft 13 of the turbine unit 5 due to air pressure or the like which affects the rotors 6a and 7a. In addition, the turbine unit 5 used in the air cooling system provides a very high rotational speed of, for example, approximately 80,000 to 100,000 rotations per minute. Therefore, when the above described thrust force affects the rolling contact bearings 15 and 16 for supporting the rotating main shaft 13, the durability of the bearings 15 and 16 is reduced.

In this embodiment, the above described thrust force is supported by an electromagnet 17, and therefore, the thrust force which affects the rolling contact bearings 15 and 16 for supporting the main shaft 13 can be reduced while preventing the torque from increasing without any contact. In this case, pressure sensors 61 to 64 for detecting the thrust force which affects the main shaft 13 through the air within the compressor 6 and the expansion turbine 7 and a controller 19A for controlling the support force due to the above described electromagnet 17 in accordance with the estimated value of the thrust force calculated and found from the outputs of these pressure sensors 61 to 64 are provided so that the above described thrust force can be cancelled in the configuration, and therefore, no excessive thrust force affects the rolling contact bearings 15 and 16 relative to the specifications of these bearings, which can thus be used in an optimal state for the thrust force.

Therefore, a stable high speed rotation of the main shaft 13 can be attained with the rotors 6a and 7a keeping appropriate gaps d1 and d2, and the durability and the life of the rolling contact bearings 15 and 16 can be increased. The durability of the bearings 15 and 16 increases, and therefore, as a whole, the reliability of the turbine unit 5 for air cooling increases, and thus, as a whole, the reliability of the air cycle refrigerating/cooling system increases. In this manner, the stable high speed rotation, durability and reliability of the main shaft bearings 15 and 16 in the turbine unit 5, which is an obstacle of the air cycle refrigerating/cooling system, can be increased, and therefore, it becomes possible to put the air cycle refrigerating/cooling system into practice.

In this particular embodiment, pressure sensors 61 to 64 are used as a means for detecting the thrust force which affects the main shaft 13, and therefore, the configuration of the detection unit is simple, has high reliability and can be made at a low cost.

In addition, the operational state of the air cycle refrigerating/cooling system as a whole affects the air pressure within the compressor 6 and the expansion turbine 7 of the turbine unit 5, and pressure sensors 61 to 64 for detecting this air pressure are provided, and therefore, the operational state of the air cycle refrigerating/cooling system can be monitored with this detected value.

The respective bearings 15 and 16 are placed in close proximity to the compressor rotor 6a and the turbine rotor 7a so that the main shaft 13 is supported at both ends, and therefore, a more stable rotation at high speed becomes possible. In addition, the respective bearings 15 and 16 made up of rolling contact bearings apply preload to the resilient element 26, and therefore, the location of the main shaft 13 in the axial direction is stabilized so that the microscopic gaps d1 and d2 vis-à-vis the rotors 6a and 7a are kept without fail and a more stable rotation at high speed can be attained.

Non-contact seals 21 and 22 are provided between the main shaft 13 on the end portion sides of the respective bearings 15 and 16 and the spindle housing 14, and therefore, air can be prevented from passing through the bearings 15 and 16 and leaking into the space between the compressor 6 and the expansion turbine 7. There is a great difference in the air pressure between the inside of the compressor 6 and the inside of the expansion turbine 7, and therefore, air tends to leak after passing through the inside of the respective bearings 15 and 16 as well as the surfaces of the inner and outer rings 15a and 16a of the respective bearings 15 and 16 which make contact with the main shaft 13 and the spindle housing 14.

This air leakage lowers the efficiency of the compressor 6 and the expansion turbine 7, and there is a risk that the air that passes through the bearings 15 and 16 may make the lubricant inside the bearings dry and the inside of the bearings 15 and 16 dirty in the case where there is dust in the air, and thus, may lower durability. Such a reduction in the efficiency and dirtiness of the bearings 15 and 16 can be prevented by the above described non-contact seals 21 and 22.

Aspects which can provide the embodiments of the present invention are summarized in the following with the air cycle refrigerating/cooling systems according to the above described first to third aspects and the turbine units for air cycle refrigerating/cooling according to the above described fourth and fifth aspects as a base.

[Sixth Aspect] An air cycle refrigerating/cooling system according to any of the above described first to third aspects where a sensor for detecting the thrust force which affects the above described main shaft and a controller for controlling the support force with the above described electromagnet on the basis of the output of this sensor are provided.

That is to say, a sensor for detecting the thrust force which affects the above described main shaft through the air inside the above described compressor and expansion turbine and a controller for controlling the support force by the above described electromagnet on the basis of the output of this sensor may be provided.

The bearings for supporting the main shaft which rotates can be used in an optimal state for the thrust force by controlling the support force with the electromagnet, and thus, more stability at high speed and an increase in the durability and the life of the bearings can be achieved so that the reliability of the system can be further increased.

[Seventh Aspect] An air cycle refrigerating/cooling system according to any of the above described first to third aspects where the above described bearings are formed of a rolling contact bearing with grease as a lubricant.

That is to say, the bearings for supporting the above described main shaft may be rolling contact bearings. It is preferable for these rolling contact bearings to have a function of holding the gap between the inner and outer rings in the axial direction, such as deep groove ball bearings. In addition, they may be angular ball bearings.

In order to secure the efficiency in the compression and expansion of the turbine unit, it is necessary to keep the gaps between the respective rotors and the housing microscopic. In air cooling systems, it is important to secure the efficiency in this manner. In order to do so, the main shaft of the rotors is supported by rolling contact bearings so that the location of the main shaft is restricted due to the function of the rolling contact bearings of restricting movement in the axial direction, and thus, the microscopic gaps between the respective rotors and the housing can be kept constant. In the case of the rolling contact bearings having a function of restricting movement in the axial direction, a reduction in the durability of the bearings which rotate at high speed due to the above described thrust force becomes a problem, but the thrust force is supported by an electromagnet, and therefore, the durability of the rolling contact bearings can be secured. As described above, the main shaft is supported by the rolling contact bearings in the radial direction so that the thrust force is controlled by an electromagnet, and therefore, a stable rotation of the main shaft at high speed can be attained while keeping the microscopic gaps of the rotors.

In addition, it is preferable for the above described rolling contact bearings to have grease as a lubricant. In air cycle refrigerating/cooling systems, air which becomes the coolant is sent as is into the space to be cooled, such as a refrigerator, and therefore, there is a risk that a mist from the lubricant may pollute the cooling air in the case of an oil lubricant. The degree of such a problem of polluting the air to be cooled can be reduced because the lubricant is grease.

[Eighth Aspect] An air cycle refrigerating/cooling system according to any of the above described first to third aspects where a sensor for detecting the thrust force which affects the above described main shaft is placed on the stationary side in close proximity to the above described bearings.

[Ninth Aspect] An air cycle refrigerating/cooling system according to any of the above described first to third aspects where the above described compressor rotor and turbine rotor are provided at both ends of the main shaft, and the above described bearings and the above described electromagnet are installed between the above described compressor rotor and turbine rotor in the spindle housing.

That is to say, the compressor rotor and the turbine rotor may be provided at either end of the main shaft in the turbine unit, and the bearings for supporting the above described main shaft and the electromagnet may be installed between the above described compressor rotor and turbine rotor in the spindle housing. The length of the main shaft can be shortened by placing main components between the compressor rotor and the turbine rotor, and thus, more stable rotation at high speed can be attained.

[Tenth Aspect] An air cycle refrigerating/cooling system according to the above described ninth aspect where a non-contact seal is provided at least either between the above described compressor rotor and the bearing in close proximity thereof, which are between the outer periphery of the above described main shaft and the spindle housing, or between the turbine rotor and the bearing in close proximity thereof, which are between the outer periphery of the above described main shaft and the spindle housing.

That is to say, in the case where bearings are provided on both sides, a non-contact seal may be provided at least either between the above described compressor rotor and the bearing in close proximity thereof, which are between the outer periphery of the main shaft and the spindle housing, or between the turbine rotor and the bearing in close proximity thereof, which are between the outer periphery of the above described main shaft and the spindle housing.

When a non-contact seal is provided, the difference in the air pressure between the inside of the compressor and the inside of the expansion turbine prevents air from leaking through the respective bearings or along the surface where these bearings and the spindle housing make contact, and thus, the efficiency of the turbine unit can be maintained, and pollution by the air which passes through the bearings and drying of the lubricant can be prevented.

[Eleventh Aspect] An air cycle refrigerating/cooling system according to the above described tenth aspect where a labyrinth seal having a number of circumferential trenches is provided as the above described non-contact seal.

[Twelfth Aspect] An air cycle refrigerating/cooling system according to any of the above described first to third aspects where an air for cooling guiding path for guiding air which flows into the above described compressor, air that has been compressed by the above described compressor and cooled by another heat exchanger or air that has been adiabatically expanded by the above described expansion turbine to the periphery of the above described bearings is provided.

That is to say, a cooling air guiding path for guiding air that has been compressed by the above described compressor and cooled by another heat exchanger or air that has been adiabatically expanded by the above described expansion turbine to the periphery of the above described bearings may be provided.

When this cooling air guiding path is provided, the temperature of the bearings which tend to become of a high temperature as a result of high speed rotation can be prevented from rising in a simple configuration, and thus, the life of the bearings and the life of the grease increase.

[Thirteenth Aspect] An air cycle refrigerating/cooling system according to the above described twelfth aspect where a flow out path for allowing the cooling air that has been guided to the periphery of the above described bearings from the above described cooling air guiding path to flow out to the inlet of the above described compressor is provided.

That is to say, in the case where a cooling air guiding path is provided as described above, a flow out path for allowing the cooling air that has been guided to the periphery of the rolling contact bearings from the above described cooling air guiding path to flow out to the inlet of the above described compressor may be provided.

When this flow out path is provided, air flow from the cooling air guiding path to the bearings becomes excellent, and the effects of cooling the bearings are increased.

[Fourteenth Aspect] An air cycle refrigerating/cooling system according to the above described sixth aspect where the above described controller is attached to the spindle housing.

That is to say, the above described controller may be attached to the spindle housing.

When the above described controller is attached to the spindle housing, connections between the electromagnet, the sensors and the controller become simple, thus making the system compact.

[Fifteenth Aspect] An air cycle refrigerating/cooling system according to the above described fourteenth aspect where the connection between the controller and the outside includes a power line or a communication line.

That is to say, the connection between the above described controller and the outside may have a configuration where a power line or a communication line is provided. The controlling and monitoring of the above described turbine unit from the outside are made easy, thus making a stable system operation possible.

[Sixteenth Aspect] A turbine unit for air cycle refrigerating/cooling according to the above described fourth or fifth aspect where the above described air pressure measuring unit detects at least one of the pressure on the output side of the above described expansion turbine, the back pressure of the above described turbine rotor, the pressure on the input side of the above described compressor and the back pressure of the above described compressor rotor.

That is to say, the above described air pressure measuring unit may detect at least one of the pressure on the output side of the above described expansion turbine, the back pressure of the above described turbine rotor, the pressure on the input side of the above described compressor and the back pressure of the above described compressor rotor.

When the air pressure in any of the above described portions is detected, it becomes possible to detect the thrust force which affects the main shaft.

[Seventeenth Aspect] A turbine unit for air cycle refrigerating/cooling according to the above described fourth or fifth aspect where a number of air pressure measuring unit for detecting all of the pressure on the output side of the above described expansion turbine, the back pressure of the above described turbine rotor, the pressure on the input side of the above described compressor and the back pressure of the above described compressor rotor are provided.

That is to say, a number of air pressure measuring unit for detecting all of the pressure on the output side of the above described expansion turbine, the back pressure of the above described turbine rotor, the pressure on the input side of the above described compressor and the back pressure of the above described compressor rotor may be provided as the above described air pressure measuring unit.

When the air pressure in these four places is measured, the thrust force which affects the main shaft can be detected with high precision.

[Eighteenth Aspect] A turbine unit for air cycle refrigerating/cooling according to the above described fourth or fifth aspect where a number of air pressure detecting unit are provided, and a thrust force estimation calculating unit for calculating the estimated value of the thrust force which is applied to the above described main shaft from the outputs of these air pressure measuring units is provided.

That is to say, in the case where air pressure measuring unit for detecting the air pressure in a number of places from among the pressure on the output side of the above described expansion turbine, the back pressure of the above described turbine rotor, the pressure on the input side of the above described compressor and the back pressure of the above described compressor rotor are provided, a thrust force estimation calculating unit for calculating the estimated value of the thrust force which is applied to the main shaft from the outputs of the number of air pressure measuring unit may be provided.

When the estimated value of the thrust force which is applied to the main shaft from the outputs of the number of air pressure measuring unit is calculated, an appropriate output of the sensors for controlling the thrust force can be attained with high precision.

[Nineteenth Aspect] A turbine unit for air cycle refrigerating/cooling according to the above described fourth or fifth aspect where a temperature sensor is provided in the vicinity of the above described air pressure measuring unit, and a temperature correcting unit for correcting the output of the above described air pressure measuring unit on the basis of the output of this temperature sensor is provided.

That is to say, a temperature sensor may be provided in the vicinity of the above described air pressure measuring unit, and a temperature correcting unit for correcting the output of the above described air pressure measuring unit on the basis of the output of this temperature sensor may be provided.

The temperature of each portion in the turbine unit fluctuates, and therefore, the measured value of the air pressure measuring unit is corrected by providing temperature sensors so that detection with high precision can be attained. The temperature sensors are provided in the vicinity of the air pressure measuring unit, and therefore, the air pressure can be corrected on the basis of the temperature with higher precision.

[Twentieth Aspect] A turbine unit for air cycle refrigerating/cooling according to the above described eighteenth aspect where a controller for controlling the support force by the above described electromagnet in accordance with the estimated value of the thrust force applied to the above described main shaft is provided.

[Twenty-first Aspect] A turbine unit for air cycle refrigerating/cooling according to the above described fourth or fifth aspect where a controller for controlling the support force by the above described electromagnet on the basis of the outputs of the above described air pressure measuring unit is provided, and this controller is attached to the spindle housing.

That is to say, a controller for controlling the support force by the above described electromagnet on the basis of the outputs of the above described air pressure measuring unit may be provided.

When the support force by the electromagnet is controlled, the rolling contact bearings for supporting the main shaft which rotates can be used in an optimal state for the thrust force, and more stability at high speed and an increase in the durability and the life of the rolling contact bearings can be achieved, thus increasing the stability of the system.

In addition, the controller may be attached to the spindle housing.

When the above described controller is attached to the spindle housing, the connection between the electromagnet and the controller becomes simple, thus making the system compact.

What is claimed is:

1. An air cycle refrigerating/cooling system composing a turbine unit which includes a compressor for compressing air and an expansion turbine for adiabatically expanding the air, wherein
    a compressor rotor of the compressor and a turbine rotor of the expansion turbine are attached to both ends of the same main shaft in the turbine unit in such a manner that the main shaft is rotatably supported by a bearing, and part or the entirety of a thrust force applied to the main shaft is supported by an electromagnet,
    the bearing being installed between the compressor rotor and the turbine rotor in the spindle housing that houses the main shaft,
    the system further comprising a non-contact seal at least either between the compressor rotor and the bearing in close proximity thereof, which is between the outer periphery of the main shaft and the spindle housing, or between the turbine rotor and the bearing in close proximity thereof, which is between the outer periphery of the main shaft and the spindle housing,
    the bearing being a rolling contact bearing for supporting the main shaft in a radial direction,
    the spindle housing including therewithin a bearing cooling air guiding path for making air in the inlet portion of the expansion turbine flow to a portion in the vicinity of the bearing on the compressor side, and
    the main shaft including therewithin a flow out path for making the air flown to the portion in the vicinity of the bearing on the compressor side to the inlet side of the compressor.

2. The air cycle refrigerating/cooling system according to claim 1, further comprising a pre-compressing unit, a first heat exchanger and a second heat exchanger, wherein
    the air is compressed by the pre-compressing unit, cooled by the first heat exchanger, compressed by the compressor in the turbine unit, cooled by the second heat exchanger and adiabatically expanded by the expansion turbine in the turbine unit in sequence, and
    the turbine unit drives the compressor rotor with the power generated by the turbine rotor.

3. A turbine unit for air cycle refrigerating/cooling used in the air cycle refrigerating/cooling system according to claim 2, further comprising an air pressure measuring unit for measuring the air pressure in at least either the compressor or the expansion turbine.

4. The air cycle refrigerating/cooling system according to claim 1, further comprising a first heat exchanger and a second heat exchanger, wherein the air is compressed by the compressor in the turbine unit, cooled by the first heat exchanger, cooled by the second heat exchanger and adiabatically expanded by the expansion turbine in the turbine unit in sequence, and in the turbine unit, a motor rotor is attached to the main shaft so that a magnetic force from a motor stator which faces the motor rotor makes the main shaft rotate, and thus, the compressor rotor is driven.

5. A turbine unit for air cycle refrigerating/cooling used in the air cycle refrigerating/cooling system according to claim 4, further comprising an air pressure measuring unit for measuring the air pressure in at least either the compressor or the expansion turbine.

* * * * *